United States Patent
Senshu (10) Patent No.: US 7,492,895 B2
(45) Date of Patent: Feb. 17, 2009

(54) DATA RECORDING METHOD AND APPARATUS, DATA REPRODUCING METHOD AND APPARATUS, AND DATA RECORDING AND/OR REPRODUCING SYSTEM

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 09/770,397

(22) Filed: Jan. 29, 2001

(65) Prior Publication Data

US 2001/0038694 A1    Nov. 8, 2001

(30) Foreign Application Priority Data

Feb. 3, 2000    (JP)    ............... 2000-032699

(51) Int. Cl.
  *H04N 7/167*    (2006.01)
(52) U.S. Cl. .................. 380/201; 380/200; 380/202; 380/203; 380/281; 380/286; 726/26; 726/31; 726/32; 713/189; 713/193
(58) Field of Classification Search .................. 713/176; 380/201, 200, 202, 203, 281, 286; 382/100; 705/58, 57; 726/31, 26, 33
See application file for complete search history.

(56) References Cited

U.S. PATENT DOCUMENTS

| | | | | |
|---|---|---|---|---|
| 5,557,346 A | * | 9/1996 | Lipner et al. ................. | 380/286 |
| 5,668,945 A | * | 9/1997 | Ohba et al. .................... | 726/30 |
| 6,073,123 A | * | 6/2000 | Staley .......................... | 705/58 |
| 6,167,136 A | * | 12/2000 | Chou .......................... | 380/201 |
| 6,301,663 B1 | * | 10/2001 | Kato et al. ................... | 713/176 |
| 6,950,941 B1 | * | 9/2005 | Lee et al. ..................... | 713/193 |

(Continued)

FOREIGN PATENT DOCUMENTS

JP    5-298085    11/1993

(Continued)

OTHER PUBLICATIONS

Kaplan, IBM Cryptolopes, SuperDistribution and Digital Rights Management, 1996, http://www.research.ibm.com./people/k/kaplan/cryptolope-docs/crypap.html, pp. 1-10.*

*Primary Examiner*—Kim Vu
*Assistant Examiner*—Beemnet W Dada
(74) *Attorney, Agent, or Firm*—Oblon, Spivak, McClelland, Maier & Neustadt, P.C.

(57) ABSTRACT

Even though data transmitted between a data processing apparatus and disc recording and/or reproducing apparatus is monitored, copying the data is effectively prevented and the data can be protected. A write ID generator 20 of a disc recording and/or reproducing apparatus 10 generates independent write ID for each recording of data, and transmits the write ID to an encryptor 102 of a data processing apparatus 100. The encryptor 102 encrypts contents ID to be used for key information for encrypted contents data and data control information to restrict or prohibit copy by the use of an encrypting key based on the write ID. The encrypted data are transmitted to an encryptor 24 of the disc recording and/or reproducing apparatus 10 via an I/F 101 and I/F 19, and encrypted along with the write ID by the use of an encrypting key based on disc ID, and recorded to a disc 30.

23 Claims, 5 Drawing Sheets

U.S. PATENT DOCUMENTS

2002/0073037 A1* 6/2002 Katoh ......................... 705/57
2003/0095664 A1* 5/2003 Asano et al. ................. 380/277
2004/0081426 A1* 4/2004 Tsukidate .................... 386/46
2007/0116278 A1* 5/2007 Asano et al. ................. 380/203

FOREIGN PATENT DOCUMENTS

JP      11-232776      8/1999

\* cited by examiner

DATA RECORDING METHOD AND APPARATUS, DATA REPRODUCING METHOD AND APPARATUS, AND DATA RECORDING AND/OR REPRODUCING SYSTEM

BACKGROUND OF THE INVENTION

1. Field of the Invention

The present invention relates to a data recording method and apparatus, a data reproducing method and apparatus, and a data recording and/or reproducing system, and particularly to a data recording method and apparatus, a data reproducing method and apparatus, and a data recording and/or reproducing system to prevent illegal copy of data recorded on a disc-shaped recording medium.

2. Description of Related Art

Occasionally, copying data such as digital contents data recorded on a disc-shaped recording medium etc. to another recording medium is not restricted. On the other hand, such copying is sometimes restricted or completely prohibited so as not to infringe copyright of data. In case copying data is required to be restricted or prohibited, some countermeasures have to be taken. The contents data are, for example, music, image, program, and text data. Identification information (ID) has been used to encrypt contents data or contents keys so as to prevent copying data recorded on the disc-shaped recording medium etc.

In case a data processing unit for processing contents data to be recorded and a data recording unit for recording data to a recording medium are mounted in the same apparatus, printed board, or chip, and those units are connected by their interfaces which does not output data to outside thereof, copying data can be prevented.

On the other hand, in case the data processing unit and data recording unit are mounted in different apparatuses and those apparatuses are connected by their general interfaces, data transmitted via those interfaces can be taken out from those apparatuses, which enables copying data.

Even though the data processing unit and data recording unit are mounted in the same apparatus or substrate, copying data becomes possible by monitoring data transmitted between those units via a data line connecting them.

SUMMARY OF THE INVENTION

It is therefore an object of the present invention to overcome the above-mentioned drawbacks by providing a data recording apparatus, a data reproducing apparatus, and a data recording and/or reproducing system, which is configured such that, even though the data transmitted between a data processing unit and data recording unit is monitored, the monitored data can hardly be read, and thus can prevent copy of data and effectively protect data.

It is another object of the present invention to provide a data recording method and a data reproducing method to implement the data recording apparatus and data reproducing apparatus.

According to the present invention, when recording digital data to a recording medium, independent write identification information is generated for each recording of the digital data, data identification information of the digital data and data control information are encrypted by the use of the write identification information, and at least the encrypted data identification information and data control information, and the write identification information are recorded to the recording medium.

According to the present invention, there is provided a data recording and/or reproducing system which has a data processing apparatus for encrypting data identification information of digital data and data control information, and a data recording and/or reproducing apparatus for recording the encrypted data identification information and data control information from the data processing apparatus to a recording medium, wherein the data recording and/or reproducing apparatus has means for generating independent write identification information for each recording of the digital data, and means for recording the encrypted data from the data processing apparatus and write identification information to the recording medium, and wherein the data processing apparatus encrypts the data identification information of the digital data and data control information by the use of the write identification information from the data recording and/or reproducing apparatus, and transmits the encrypted data to the data recording and/or reproducing apparatus.

The digital data is encrypted by the data identification information. The encrypted data identification information of the digital data and data control information, and the write identification information are encrypted by the use of recording medium identification information peculiar to the recording medium, and recorded to the recording medium along with the encrypted digital data.

The encrypted data identification information and data control information, and the write identification information recorded on the recording medium are read, and the encrypted data identification information and data control information are decrypted by the use of the write identification information.

According to the present invention, the independent write identification information is generated for each recording of the digital data, and the data identification information of the digital data and data control information are encrypted by the use of the generated write identification information, and at least the encrypted data identification information and data control information, and the write identification information are recorded to the recording medium. So, encrypting by the use of the recording medium identification information peculiar to the recording medium is performed for each recording of the digital data. Thus, the data identification information cannot be decrypted even though the reproduced data from the recording medium is copied, which can prevent copying data.

The digital data is encrypted by the data identification information. Accordingly, the encrypted contents data cannot be decrypted as long as the data identification information cannot be decrypted.

When the data processing unit for encrypting the digital data and data recording unit for recording data to the recording medium are mounted separately, the data identification information cannot be decrypted even though the data transmitted between the data processing unit and data recording unit is monitored, which can prevent copying data.

These objects and other objects, features and advantages of the present intention will become more apparent from the

DESCRIPTION OF THE PREFERRED EMBODIMENTS

The data recording method and apparatus, data reproducing method and apparatus, and data recording and/or reproducing system according to the present invention will further be described below with reference to the accompanying drawings.

Figure 1:
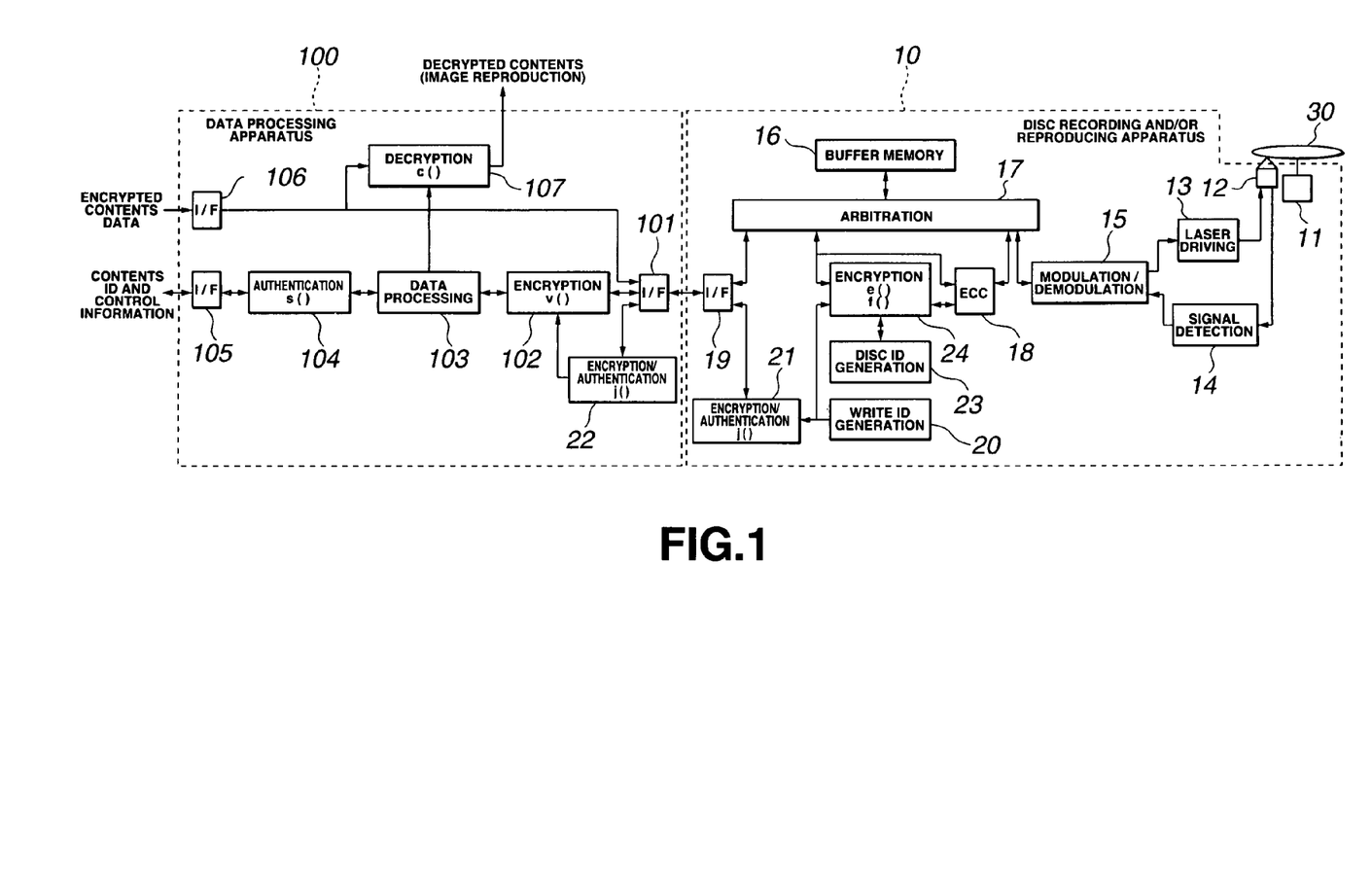
FIG. 1 shows a block diagram of a disc recording and/or reproducing apparatus and data processing apparatus employing the present invention.

FIG. 1 shows a disc recording and/or reproducing apparatus 10 as a data recording apparatus according to the present invention, and a data processing apparatus 100 which may be a personal computer connected thereto.

The disc recording and/or reproducing apparatus 10 includes a spindle motor 11 to rotate a disc 30 being a removable disc-shaped recording medium such as a write-once type optical disc, rewritable type magneto-optical disc, or phase-change type optical disc, an optical pickup 12 to radiate a laser beam to the disc 30 and receive the returning laser beam, a laser driver 13 to drive a laser light source, not shown, such as a laser diode of the optical pickup 12, a signal detector 14 to detect an output signal from the optical pickup 12, a modulator/demodulator 15 to modulate a signal to the laser driver 13 and demodulate a signal sent from the signal detector 14, a buffer memory 16 to temporarily store data, an arbitrator 17, an ECC (Error Correction Code) unit 18 to perform error correction encoding/decoding, an I/F (interface) 19 to transmit/receive data to/from the data processing apparatus 100 such as a personal computer, and a write ID generator 20 to generate write ID (identification information) for each recording of data. The arbitrator 17 arbitrates data transmitted between the buffer memory 16, and modulator/demodulator 15, ECC unit 18 and I/F 19. The write ID from the write ID generator 20 is sent to the ECC unit 18, and is also sent to the external data processing apparatus 100.

The spindle motor 11 rotates the disc 30 at a constant linear velocity or constant angular velocity under the control of a servo circuit, not shown.

When recording data to the disc 30, a laser light source of the optical pickup 12 driven by the laser driver 13 radiates a laser beam to the disc 30 via an optical system such as an objective lens. When reproducing data recorded on the disc 30, the laser light source of the optical pickup 12 radiates a laser beam to the disc 30 via the optical system, and a light-sensitive detector of the optical pickup 12 such as a photo-diode receives the returning laser beam reflected and diffracted by the surface of the disc 30, and converts the received laser beam to an electric signal, and outputs the electric signal.

When recording/reproducing data to/from the disc 30, the optical pickup 12 performs tracking servo control and focusing servo control based on the detected signal of the returning laser beam.

The write ID generator 20 generates the write ID (identification information) being identification information peculiar to each recording (contents). This write ID is updated every time the data file is recorded, and is independent identification information for each recording operation. The write ID generated for each recording is different from each other, even though the recording operation is performed in the same disc apparatus and to the same disc. The write ID may be generated based on random numbers generated by, for example, a random number generator.

The disc recording and/or reproducing apparatus 10 further includes an encryptor/authenticator 21. The write ID generated by the write ID generator 20 may be transmitted to the data processing apparatus 100 without being processed, or may be encrypted by the encryptor/authenticator 21 and transmitted to the data processing apparatus 100, if necessary. When the write ID is encrypted and transmitted to the data processing apparatus 100, the encryptor/authenticator 21 performs $j(\ )$ encryption processing for the write ID, and transmits the encrypted write ID to the data processing apparatus 100 via the I/F 19. The encryptor/authenticator 21 also performs mutual authentication with the data processing apparatus 100.

The disc recording and/or reproducing apparatus 10 further includes a disc ID generator 23 and an encryptor 24. The disc ID generator 23 generates disc ID (disc identification information), which will be described later, and sends the disc ID to the encryptor 24 connected to the ECC unit 18. The write ID (write identification information) from the write ID generator 20 is also sent to the encryptor 24.

The encryptor 24 performs $e(\ )$ encryption processing and $f(\ )$ encryption processing for data to be recorded and the write ID, respectively, by the use of a key based on the disc ID, and sends the encrypted data to the ECC unit 18 via the arbitrator 17 and buffer memory 16. The encryptor 24 also performs $e^{-1}(\ )$ decryption processing and $f^{-1}(\ )$ decryption processing for data obtained from the ECC unit 18 via the arbitrator 17 and buffer memory 16 by the use of the key based on the disc ID.

The data processing apparatus 100, such as a personal computer, which is connected to the disc recording and/or reproducing apparatus 10, includes an I/F (interface) 101 to transmit/receive data to/from the disc recording and/or reproducing apparatus 10, encryptor 102 to encrypt/decrypt data, a data processor 103 to process data in various manners, an authenticator 104 to perform mutual authentication with an external authentication institution etc., an I/F (interface) 105 to transmit/receive data identification information (contents ID, which will be described later) and data control information (for example, control information to restrict or prohibit copy generation) to/from an external unit, and an encryptor/authenticator 22 to decrypt the encrypted write ID from the I/F 101 and sends the decrypted write ID to the encryptor 102. The encryptor/authenticator 22 also performs mutual authentication with the disc recording and/or reproducing apparatus 10. The data processing apparatus 100 further includes an I/F (interface) 106 to receive encrypted contents data from outside, and a decryptor 107 to decrypt the encrypted contents data from the I/F 106 by the use of contents ID (data identification information). When the authentication is normally performed by the authenticator 104 and the user is proved to be authorized, the contents ID is sent from the data processor 103 to the decryptor 107.

Figure 2:
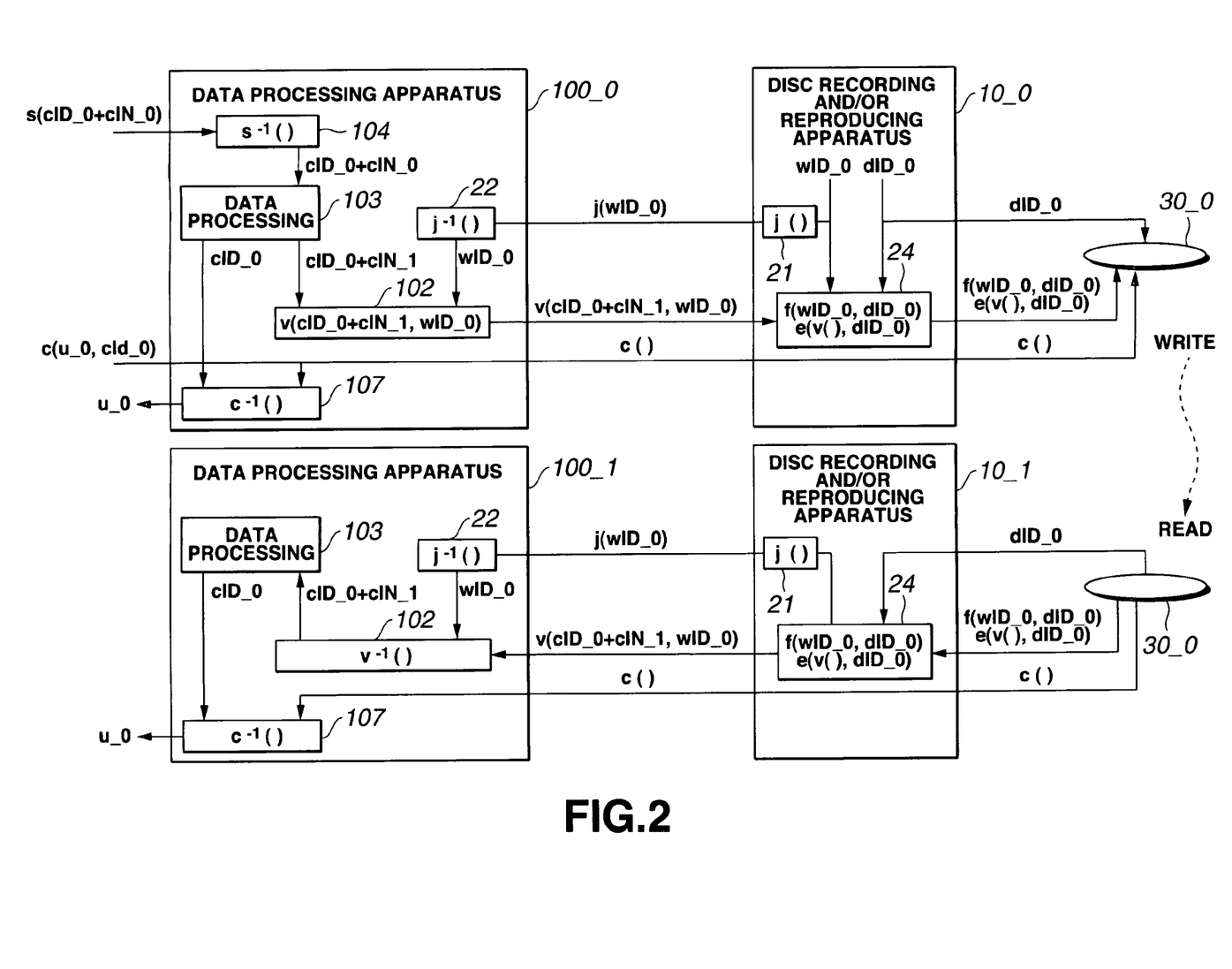
FIG. 2 shows a block diagram for explaining the case in which the encrypted data is recorded by a disc recording and/or reproducing apparatus and reproduced by another disc recording and/or reproducing apparatus.

Referring to FIG. 2, the operation of the disc recording and/or reproducing apparatus 10 and data processing apparatus 100 configured as shown in FIG. 1 will be explained. The data processing apparatus 100, such as a personal computer, connected to the disc recording and/or reproducing apparatus 10 is configured such that encrypted contents ID and control information from the authentication institution or a key distribution center are supplied thereto via the I/F 105, and encrypted contents data from a contents distribution center or contents provider is supplied thereto via the I/F 106. When the contents data is "u", contents ID to be used as a key to encrypt data is "cID", and encrypting is "c ( )", the encrypted contents data is represented as "c (u, cID)". When the control information is "cIN", and encrypting of the contents ID "cID" and control information "cIN" is "s ( )", the encrypted contents ID and control information are represented as "s (cID+cIN)".

FIG. 2 shows the case in which data recorded on a disc 30_0 obtained by recording data from the data processing apparatus 100_0 thereto by the disc recording and/or reproducing apparatus 10_0 is reproduced by another disc recording and/or reproducing apparatus 10_1. The encrypted contents data c (u_0, cID_0) and encrypted contents ID and control information s (cID_0+cIN_0) are supplied to the data processing apparatus 100_0.

The data processing apparatus 100 performs mutual authentication with an authentication institution. When the data processing apparatus 100 is proved to be authorized, the encrypted contents ID and control information s (cID+cIN) are transmitted thereto. The authorized data processing apparatus 100 can decrypt the s (cID+cIN) and obtain contents ID cID to be used as a key for the encrypted contents data.

That is, in the example shown in FIG. 2, original contents ID and control information cID_0+cIN_0 before encrypting can be obtained by performing $s^{-1}$ ( ) decryption processing for the encrypted contents ID and control information s (cID_0+cIN_0) supplied to the data processing apparatus 100_0. The distributed encrypted contents data c (u_0, cID_0) is controlled by the control information cIN_0. In case the frequency of copying contents data is restricted, the control information cIN_0 is converted to cIN_1 by the data processor 103 when recording the contents data. The frequency of copying contents data is restricted or copying contents data is prohibited in accordance with the control information. Original contents data u_0 before encrypting can be obtained by decrypting the encrypted contents data c (u_0, cID_0) by the use of the decrypted contents ID cID_0.

The disc recording and/or reproducing apparatus 10_1 of FIG. 2 generates updated write ID, for example wID_0, for each recording of data, and performs j ( ) encryption processing for the wID_0 and outputs the encrypted wID_0 to the data processing apparatus 100_0. The data processing apparatus 100_0 of FIG. 2 encrypts the contents ID and converted control information cID_0+cIN_1 by the use of the write ID wID_0 obtained by decrypting the encrypted write ID j (wID_0) from the disc recording and/or reproducing apparatus 10_1, and generates encrypted data v (cID_0+cIN_1, wID_0), and transmits the encrypted data to the disc recording and/or reproducing apparatus 10_1. The encrypted contents data c (u_0, cID_0) is transmitted to the disc recording and/or reproducing apparatus 10_1 without being processed.

The disc recording and/or reproducing apparatus 10_1 generates encrypted data f (wID_0, dID_0) by performing f ( ) encryption processing for the write ID wID_0 generated for this recording by the use of disc ID dID_0 from the disc ID generator 23 of FIG. 1, and generates encrypted data e (v ( ), dID_0) by performing e ( ) encryption processing for the encrypted contents ID and control information v (cID_0+cIN_1, wID_0) by the use of the disc ID dID_0. The v ( ) is the abbreviation for the v (cID_0+cIN_1, wID_0). When performing f ( ) encryption processing and e ( ) encryption processing, the disc ID dID_0 as well as block ID which is identification information for each block being a recording unit can be used, if necessary. These encrypted data f (wID_0, dID_0) and v (cID_0 +cIN_1, wID_0) are recorded to the disc 30_0, and the encrypted contents data c (u_0, cID_0) from the data processing apparatus 100_0 is recorded to the disc 30_0 without being processed. The disc ID dID_0 is recorded to a predetermined region (toc, data recording region, etc.) of the disc 30_0 at the time of initialization, shipment, or first recording.

Next, the case in which data of the disc 30_0 is reproduced by the disc recording and/or reproducing apparatus 10_1 other than the disc recording and/or reproducing apparatus 10_0 will be explained.

The disc recording and/or reproducing apparatus 10_1 reproduces the encrypted data e(v ( ), dID_0) and f(wID_0, dID_0), and the encrypted contents data c (u_0, cID_0) from the disc 30_0, and reproduces the disc ID dID_0 from the predetermined region of the disc 30_0. The disc recording and/or reproducing apparatus 10_1 obtains the encrypted contents ID and control information v (cID_0+cIN_1, wID_0), and the write ID wID_0 by decrypting the reproduced encrypted data e (v ( ), dID_0) and f (wID_0, dID_0) by the use of the disc ID dID_0. The disc recording and/or reproducing apparatus 10_1 transmits the encrypted data v (cID_0+cIN_1, wID_0) to the data processing apparatus 100_1 via the I/F, and performs j ( ) encryption processing for the write ID wID_0 and transmits the encrypted write ID data j (wID_0) to the data processing apparatus 100_1. The encrypted contents data c (u_0, cID_0) is transmitted to the data processing apparatus 100_1 without being processed.

The data processing apparatus 100_1 performs $j.sup.-1$ ( ) decryption processing for the encrypted write ID data j (wID_0) to obtain the write ID wID_0, and takes out the contents ID and control information cID_0+cIN_1 by decrypting the v (cID_0+cIN_1, wID_0) from the disc recording and/or reproducing apparatus 10_1 by the use of the obtained write ID wID_0. The contents data u_0 can be obtained by decrypting the encrypted contents data c (u_0, wID_0) by the use of the contents ID cID_0. At this time, the decrypting is restricted by the control information cIN_1, or the control information cIN_1 itself is processed to be changed. For example, when the copied contents data u_0 is copied to another disc again, the control information cIN_1 is changed to control information cIN_2.

According to the present invention configured as described above, the disc ID dID and write ID wID become unrelated to each other, which can prevent the disc ID dID and write ID wID from being taken out to outside from the disc recording and/or reproducing apparatus 10 and data processing apparatus 100. The disc recording and/or reproducing apparatus 10 does not have to know the v ( ) encryption processing for the contents ID and control information. The data processing apparatus 100 performs the v ( ) encryption processing on its own responsibility. And, the disc recording and/or reproducing apparatus 10 performs the e ( ) encryption processing and f ( ) encryption processing on its own responsibility. Thus, the security of the interfaces between the disc recording and/or reproducing apparatus 10 and data processing apparatus 100, and that of recording/reproducing data to/from the disc 30 by the disc recording and/or reproducing apparatus 10 can be independent.

Figure 3:
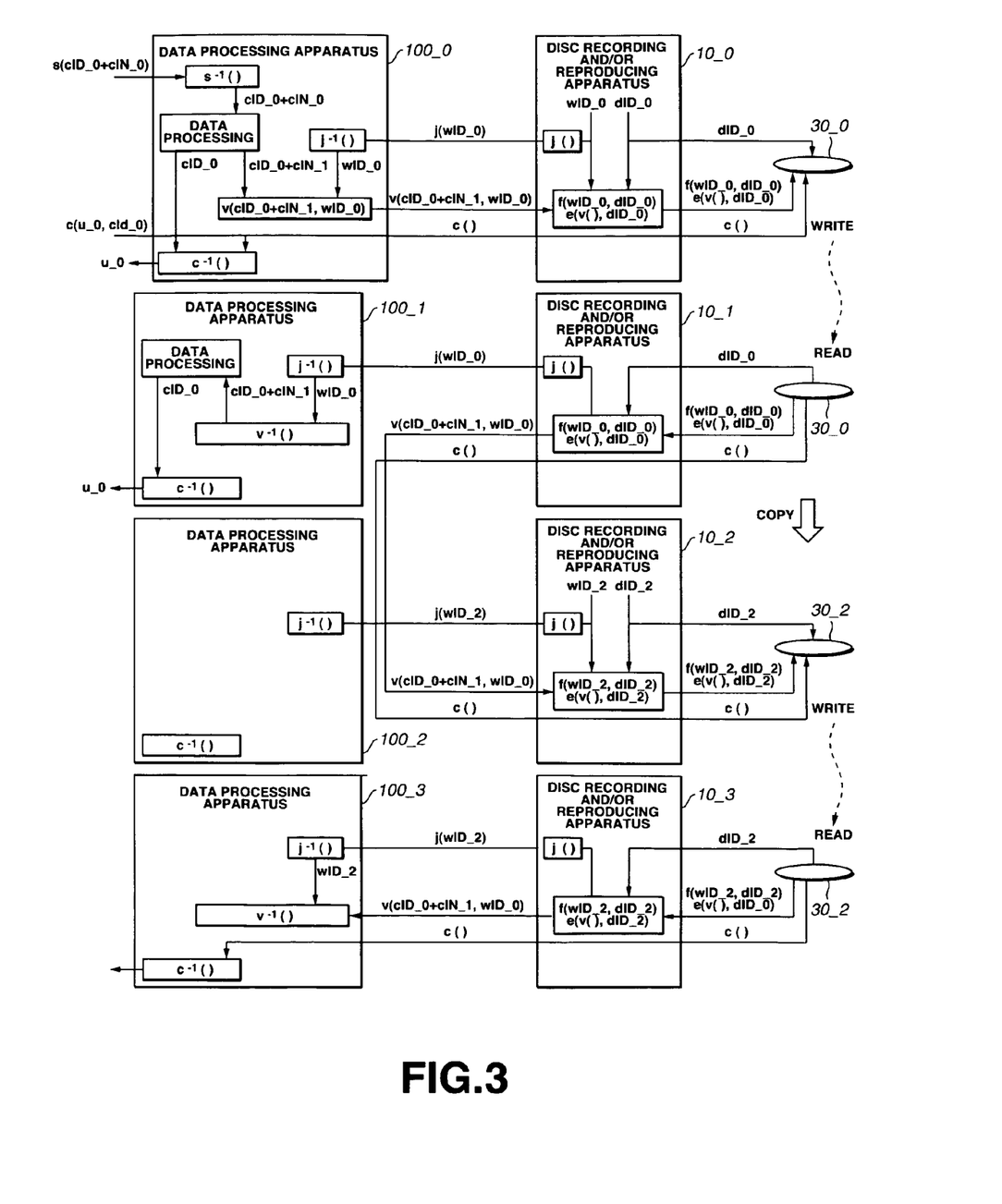
FIG. 3 shows a block diagram for explaining the case in which encrypted data recorded on a disc is copied to another disc and the copied encrypted data is reproduced.

FIG. 3 shows the case in which disc copy is prevented by encrypting data by the use of the write ID.

In FIG. 3, the data processing apparatus 100_0, data processing apparatus 100_1, disc recording and/or reproducing apparatus 10_0, and disc recording and/or reproducing apparatus 10_1 are identical with those in FIG. 2. So, the elements or parts will be indicated with the same or similar reference numerals, and the explanation will be omitted. In FIG. 3, the encrypted contents ID and control information v (cID_0+ cIN_1, wID_0) and encrypted contents data v c(u_0,cID_0) from the disc recording and/or reproducing apparatus 10_1 are transmitted to another disc recording and/or reproducing apparatus 10_2 and recorded to another disc 30_2.

The disc recording and/or reproducing apparatus 10_1 obtains the encrypted data f (wID_0, dID_0) and e (v ( ), dID_0) by reproducing the data recorded on disc 30_0, and obtains the encrypted contents ID and control information v (cID_0+cIN_1, wID_0), and the write ID wID_0 by decrypting the reproduced encrypted data f (wID_0, dID_0) and e (v ( ), dID_0) by the use of the disc ID dID_0 recorded to the predetermined position of the disc 30_0. The disc recording and/or reproducing apparatus 10_1 obtains the encrypted contents data c ( ), that is c (u_0, cID_0) by reproducing the data recorded on the disc 30_0. The encrypted data v (cID_0+ cIN_1, wID_0) and encrypted contents data c ( ) obtained from the disc recording and/or reproducing apparatus 10_1 are transmitted to the disc recording and/or reproducing apparatus 10_2 without being processed, and recorded to another disc 30_2. The disc recording and/or reproducing apparatus 10_2 generates disc ID dID_2 corresponding to the disc 30_2 and records the disc ID dID_2 to a predetermined position of the disc 30_2, and generates write ID wID_2 when recording data, and encrypts the write ID wID_2 and encrypted data v (cID_0+cIN_1, wID_0) by the use of a key based on the disc ID dID_2, and records thus obtained encrypted data e (v ( ), dID_2) and f (wID_2, dID_2) to the disc 30_2.

When reproducing data recorded on the disc 30_2 by a disc recording and/or reproducing apparatus 10_3, the encrypted data e (v ( ), dID_2) and f (wID_2, dID_2) recorded on the disc recording and/or reproducing apparatus 10_2 are reproduced and transmitted to a disc recording and/or reproducing apparatus 10_3. The encrypted contents data c ( ) is reproduced from the disc 30_2 and transmitted to the disc recording and/or reproducing apparatus 10_3. The disc recording and/or reproducing apparatus 10_3 reads the disc ID dID_2 recorded on a predetermined position of the disc 30_2, and decrypts the encrypted data e (v ( ), dID_2) and f (wID_2, dID_2) by the use of a key based on the disc ID dID_2. Thus, the copied encrypted data v (cID_0+cIN_1, wID_0) and write ID wID_2 generated when recording the encrypted data v (cID_0+cIN_1, wID_0) to the disc 30_2 are restored. The encrypted data v (cID_0+cIN_1, wID_0) are transmitted to the data processing apparatus 100_3 without being processed. The disc recording and/or reproducing apparatus 10_3 performs $j^{-1}$ ( )decryption processing for the write ID wID_2, and the encrypted write ID wID_2 is transmitted to the data processing apparatus 100_3. The data processing apparatus 100_3 performs $j^{-1}$ ( )decryption processing for the encrypted write ID j (wID_2) to obtain the write ID wID_2, and tries to decrypt the encrypted data v (cID_0 +cIN_1, wID_0) from the disc recording and/or reproducing apparatus 10_3 by the use of the write ID wID_2. However, since the encrypted data v (cID_0+cIN_1, wID_0) are encrypted by the use of a key based on the write ID wID_0, the encrypted data v (cID_0+cIN_1, wID_0) can not be decrypted. Thus, original data, that is contents ID and control information cID_0+ cIN_1 can not be obtained.

That is, the data processing apparatus 100_3 receives the write ID wID_2. On the other hand, the encrypted data v (cID_0+cIN_1, wID_0) are encrypted by the write ID wID_0. Thus, it can be seen that illegal copy is performed from this disaccord of the write ID. Since the encrypted data v (cID_0+ cIN_1, wID_0) can not be decrypted by the write ID wID_2, original contents ID and control information cID_0+cIN_1 can not be obtained.

It can be considered that, when performing disc copy, reproduced data from the disc recording and/or reproducing apparatus 10_1 is recorded by means of the disc recording and/or reproducing apparatus 10_0 which records original data. However, since updated write ID is generated, and the write ID is different from the write ID wID_0 generated at the time of recording original data. Thus, decrypting can not be performed either.

Figure 4:
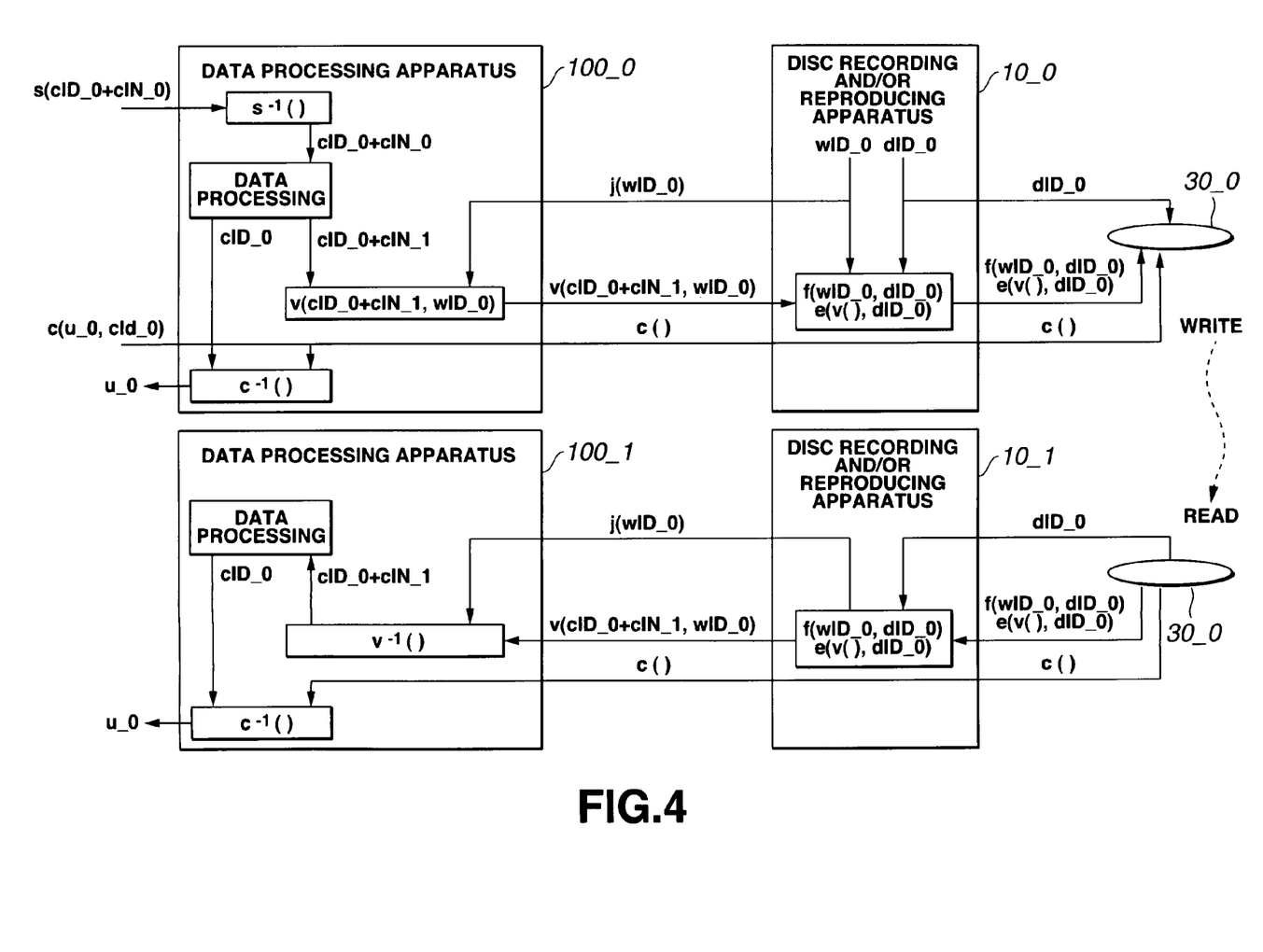
FIG. 4 shows a block diagram for explaining the case in which the write identification information is transmitted without being encrypted.

FIG. 4 shows the case in which the write ID is transmitted from the disc recording and/or reproducing apparatus 10 to the data processing apparatus 100 without being encrypted. Other than this, the elements or parts will be indicated with the same or similar reference numerals in FIG. 2. So, the explanation will be omitted.

Figure 5:
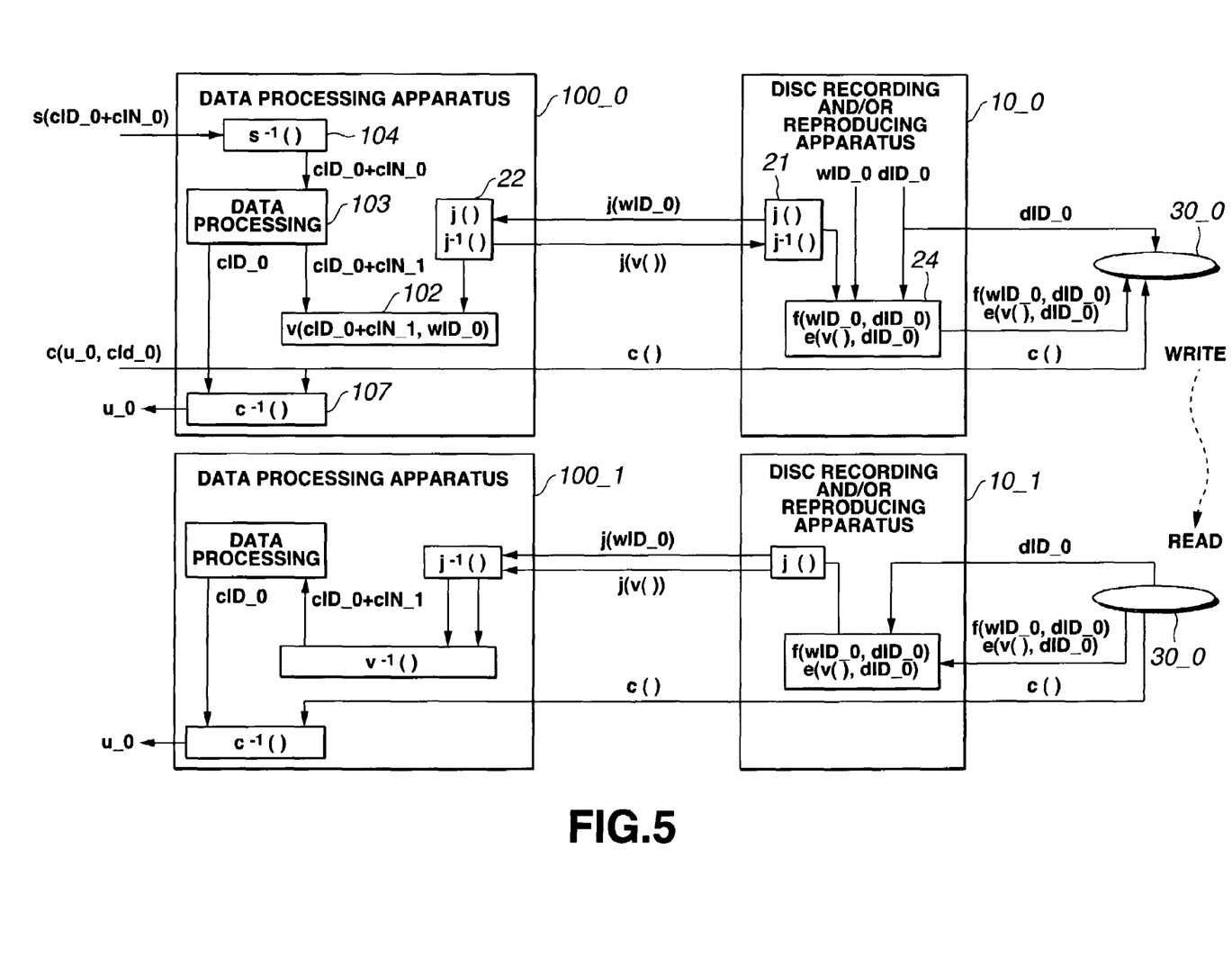
FIG. 5 shows a block diagram for explaining the case in which the write identification information is encrypted and transmitted from the disc recording and/or reproducing apparatus to the data processing apparatus, and the encrypted data identification information and data control information are encrypted and transmitted from the data processing apparatus to the disc recording and/or reproducing apparatus.

FIG. 5 shows the case in which the write ID as well as the encrypted contents ID and control information v (cID_0+ cIN_1, wID_0) is encrypted and transmitted between the disc recording and/or reproducing apparatus 10 and data processing apparatus 100.

That is, when recording data, encrypted data j (wID_0) obtained by performing j ( )encryption processing for the write ID wID_0 generated by the disc recording and/or reproducing apparatus 10_1 is transmitted to the data processing apparatus 100_0. The data processing apparatus 100_0 encrypts the contents ID and control information cID_0+ cIN_1 by the use of the write ID wID_0 obtained by decrypting the encrypted data j (wID_0) to generate the encrypted data v (cID_0+cIN_1, wID_0), and performs j ( ) encryption processing for the encrypted data v (cID_0+cIN_1, wID_0), and transmits the encrypted data to the disc recording and/or reproducing apparatus 10_1.

When reproducing data, the disc recording and/or reproducing apparatus 10_1 decrypts the encrypted data e (v ( ), dID_0) and f (wID_0, dID_0) obtained by reproducing data recorded on the disc 30_0 by the use of the disc ID dID_0 reproduced from the disc 30_0 to obtain the write ID wID_0 and encrypted data v (cID_0+cIN_1, wID_0), and performs j ( )encryption processing for the write ID wID_0 and encrypted data v (cID_0+cIN_1, wID_0), and transmits thus obtained encrypted data j (wID_0) and j (v ( ))to the data processing apparatus 100_0. The data processing apparatus 100_0 performs $j^{-1}$ ( ) decryption processing for the encrypted data j (wID_0) and j (v ( ))to obtain the wID_0 and v (cID_0+cIN_1, wID_0).

In FIG. 5, the elements or parts will be indicated with the same or similar reference numerals in FIG. 2, and the explanation is omitted.

The present invention is not restricted to the above-mentioned embodiments. In the embodiments, the data processing unit and disc recording and/or reproducing unit are mounted in independent apparatuses. On the other hand, the data processing unit and disc recording and/or reproducing unit can be mounted in independent substrates mounted in the same apparatus, or in independent circuits mounted in the same substrate. The recording medium is not restricted to the disc-shaped recording medium, and my be a card-shaped or tape-shaped recording medium. The user data can be data which is not encrypted, or data which has already been encrypted by another encrypting key. Furthermore, the write ID as well as recording medium ID (disc ID etc.) peculiar to a recording medium such as a disc, and block ID peculiar to a block (sector, frame, etc.) being a unit for encoding or a unit for recording. In this case, random number generators for generating the write ID, disc ID, and block ID can be common. Various modifications can be possible without departing from the spirit and scope of the present invention.

What is claimed is:

1. A data recording method for recording digital data to a recording medium, comprising the steps of:
   obtaining a unique recording medium ID corresponding to the recording medium from a predetermined region of the recording medium, the recording medium ID pre-recorded on the predetermined region of the recording medium;
   generating independent write identification information for every recording operation performed on the digital data;
   encrypting data identification information of the digital data and data control information by the use of the write identification information and encrypting the write identification information by use of the recording medium ID; and
   recording at least the encrypted data identification information and data control information to the recording medium,
   wherein the data control information includes copy control information for the digital data.

2. The data recording method as set forth in claim 1, wherein the digital data is encrypted by the data identification information, and the encrypted digital data is recorded to the recording medium along with the encrypted data identification information and data control information, and the write identification information.

3. The data recording method as set forth in claim 1, wherein the encrypted data identification information and data control information, and the write identification information are encrypted by the use of recording medium unique to the recording medium and recorded to the recording medium.

4. The data recording method as set forth in claim 1, wherein a data processing unit for encrypting the data identification information and data control information and a data recording unit for recording data to the recording medium are mounted separately, and the write identification information is generated at the data recording unit, and the generated write identification information is encrypted and transmitted to the data processing unit.

5. A data recording apparatus for recording digital data, comprising:
   a computer readable recording medium;
   means for obtaining a unique recording medium ID corresponding to the computer readable recording medium from a predetermined region of the computer readable recording medium, the recording medium ID pre-recorded on the predetermined region of the computer readable recording medium;
   means for generating independent write identification information for every recording operation performed on the digital data;
   means for encrypting data identification information of the digital data and data control information by the use of the write identification information and encrypting the write identification information by use of the recording medium ID; and
   means for recording at least the encrypted data identification information and data control information to the computer readable recording medium,
   wherein the data control information includes copy control information for the digital data.

6. The data recording apparatus as set forth in claim 5, wherein the digital data is encrypted by the data identification information, and the encrypted digital data is recorded to the computer readable recording medium along with the encrypted data identification information and data control information, and the write identification information.

7. The data recording apparatus as set forth in claim 5, wherein the encrypted data identification information and data control information, and the write identification information are encrypted by the use of recording medium ID unique to the computer readable recording medium and recorded to the computer readable recording medium.

8. A data recording and/or reproducing system, comprising:
   a computer readable recording medium;
   a data processing apparatus for encrypting data identification information of digital data and data control information; and
   a data recording and/or reproducing apparatus for recording the encrypted data identification information and data control information from the data processing apparatus to the computer readable recording medium,
   wherein the data recording and/or reproducing apparatus is configured to obtain a unique recording medium ID corresponding to the computer readable recording medium from a predetermined region of the computer readable recording medium, the recording medium ID pre-recorded on the predetermined region of the computer readable recording medium, and has means for generating independent write identification information for every recording operation performed on the digital data, and means for recording the encrypted data from the data processing apparatus to the computer readable recording medium, said write identification information being encrypted through use of said recording medium ID, and
   wherein the data processing apparatus encrypts the data identification information of the digital data and data control information by the use of the write identification information from the data recording and/or reproducing apparatus, and transmits the encrypted data to the data recording and/or reproducing apparatus,
   wherein the data control information includes copy control information for the digital data.

9. The data recording and/or reproducing system as set forth in claim 8, wherein the digital data is encrypted by the data identification information, and the data recording and/or reproducing apparatus records the encrypted digital data to the computer readable recording medium along with the encrypted data identification information and data control information.

10. The data recording and/or reproducing system as set forth in claim 8, wherein the data recording and/or reproducing apparatus encrypts the encrypted data identification information and data control information from the data processing apparatus, and the write identification information by the use of recording medium ID unique to the computer readable recording medium, and records the encrypted data to the computer readable recording medium.

11. The data recording and/or reproducing system as set forth in claim 8, wherein the data recording and/or reproducing apparatus authenticates the data processing apparatus when transmitting the write identification information thereto, and encrypts the write identification information and transmits the encrypted data to the data processing apparatus when it is proved to be authorized.

12. A data reproducing method for reproducing digital data from a recording medium, comprising the steps of:
   reproducing encrypted data identification information and data control information, and write identification information, which are encrypted by the use of a unique recording medium ID obtained from a predetermined region of the recording medium, the recording medium ID pre-recorded on the predetermined region of the recording medium and corresponding to the recording medium and are embedded in the digital data;
   decrypting the encrypted data identification information and data control information by the use of the write identification information created during the reproducing, and obtaining the data identification information of the digital data and data control information,
   wherein the data identification information and data control information is generated for every recording operation performed on the digital data, and
   wherein the data control information includes copy control information for the digital data.

13. The data reproducing method as set forth in claim 12, wherein the digital data is encrypted by the data identification information and recorded to the recording medium, and the encrypted digital data is reproduced from the recording medium along with the encrypted data identification information and data control information.

14. The data reproducing method as set forth in claim 12, wherein the encrypted data identification information and data control information, and the write identification information are encrypted by the use of the recording medium ID unique to the recording medium and recorded to the recording medium, and the recording medium ID is reproduced from the recording medium, and the data encrypted by the recording medium identification information are decrypted by the use of the recording medium ID, and the encrypted data identification information and data control information, and the write identification information are taken out.

15. The data reproducing method as set forth in claim 12, wherein a data processing unit for encrypting the data identification information and data control information and a data recording unit for recording data to the recording medium are mounted separately, and the write identification information is generated at the data recording unit, and the generated write identification information is encrypted and transmitted to the data processing unit.

16. A data reproducing apparatus for reproducing digital data, comprising:
   a computer readable recording medium;
   means for reproducing encrypted data identification information of the digital data and data control information, which are encrypted by the use of independent write identification information created for every recording operation performed on the digital data, and the write identification information from the computer readable recording medium;
   means for decrypting the encrypted data identification information and data control information by the use of the write identification information, and obtaining the data identification information and data control information from the reproduced data; and
   means for decrypting the write identification information with a recording medium ID, which corresponds to and is unique to the computer readable recording medium, the recording medium ID obtained from a predetermined region of the computer readable recording medium, the recording medium ID pre-recorded on the predetermined region of the computer readable recording medium,
   wherein the data control information includes copy control information for the digital data.

17. The data reproducing apparatus as set forth in claim 16, wherein the digital data is encrypted by the data identification information and recorded to the computer readable recording medium, and the encrypted digital data is reproduced from the computer readable recording medium along with the encrypted data identification information and data control information, and the write identification information.

18. The data reproducing apparatus as set forth in claim 17, wherein the encrypted data identification information and data control information, and the write identification information are encrypted by the use of the recording medium ID and recorded to the computer readable recording medium, and the recording medium ID is reproduced from the computer readable recording medium, and the data encrypted by the computer readable recording medium identification information are decrypted by the use of the recording medium ID, and the encrypted data identification information and data control information, and the write identification information are taken out.

19. A data recording and/or reproducing system comprising:
   a computer readable recording medium;
   a data recording and/or reproducing apparatus for reproducing encrypted data which are encrypted by the use of independent write identification information that is created for every recording operation performed on the digital data from a recording medium; and
   a data processing apparatus for decrypting the encrypted data and obtaining data identification information of the digital data and data control information from the reproduced data,
   wherein the data recording and/or reproducing apparatus has means for reproducing the write identification information and the encrypted data from the recording medium, and means for transmitting the reproduced data to the data processing apparatus,
   wherein the data processing apparatus decrypts the encrypted data which are encrypted by the use of the write identification information created during a recording operation using the data recording and/or reproducing apparatus, and obtains the data identification information of the digital data and data control information, said write identification information being decrypted by a recording medium ID that corresponds to and is unique to the recording medium, the recording medium ID obtained from a predetermined region of the recording medium, the recording medium ID pre-recorded on the predetermined region of the recording medium, and
   wherein the data control information includes copy control information for the digital data.

20. The data recording and/or reproducing system as set forth in claim 19, wherein the digital data is encrypted by the data identification information and recorded to the recording medium, and the data recording and/or reproducing apparatus reproduces the encrypted digital data from the recording medium along with the encrypted data identification information and data control information, and the write identification information.

21. The data recording and/or reproducing system as set forth in claim 19, wherein the encrypted data identification information and data control information, and the write identification information are encrypted by the use of the recording medium ID and recorded to the recording medium, and the recording medium ID is reproduced from the recording medium, and the data encrypted by the recording medium ID are decrypted by the use of the recording medium ID, and the encrypted data identification information and data control information, and the write identification information are taken out.

22. The method of claim 1, wherein said generating step includes generating the write identification information with a random number generator.

23. The method of claim 1, wherein said predetermined region of the recording medium is the table of contents (TOC) region of the recording medium.

* * * * *